United States Patent
Bethge et al.

(10) Patent No.: US 12,322,193 B2
(45) Date of Patent: Jun. 3, 2025

(54) SYSTEM FOR A MOTOR VEHICLE AND METHOD FOR ASSESSING THE EMOTIONS OF A DRIVER OF A MOTOR VEHICLE

(71) Applicant: Dr. Ing. h.c. F. Porsche Aktiengesellschaft, Stuttgart (DE)

(72) Inventors: David Bethge, Stuttgart-Feuerbach (DE); Tobias Große-Puppendahl, Tübingen (DE); Mohamed Kari, Essen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 335 days.

(21) Appl. No.: 17/863,515

(22) Filed: Jul. 13, 2022

(65) Prior Publication Data

US 2023/0020786 A1 Jan. 19, 2023

(30) Foreign Application Priority Data

Jul. 14, 2021 (DE) ..................... 10 2021 118 154.2

(51) Int. Cl.
*G06V 20/59* (2022.01)
*G01S 19/01* (2010.01)
*G06V 10/12* (2022.01)
*G06V 10/774* (2022.01)

(52) U.S. Cl.
CPC ............ *G06V 20/597* (2022.01); *G01S 19/01* (2013.01); *G06V 10/12* (2022.01); *G06V 10/774* (2022.01)

(58) Field of Classification Search
CPC .... G06V 20/597; G06V 10/12; G06V 10/774; G01S 19/01
See application file for complete search history.

(56) References Cited

U.S. PATENT DOCUMENTS

| | | | |
|---|---|---|---|
| 10,074,024 B2 | 9/2018 | el Kaliouby et al. | |
| 10,647,326 B2 | 5/2020 | Goto | |
| 2007/0124027 A1 | 5/2007 | Betzitza et al. | |
| 2017/0053461 A1* | 2/2017 | Pal | G08G 1/012 |
| 2019/0185014 A1* | 6/2019 | Choo | B60W 40/09 |
| 2020/0056902 A1* | 2/2020 | Woo | A61B 5/6893 |
| 2020/0082590 A1* | 3/2020 | Woo | G06V 40/28 |

(Continued)

FOREIGN PATENT DOCUMENTS

| | | |
|---|---|---|
| DE | 10343683 A1 | 4/2005 |
| DE | 102018128195 A1 | 5/2019 |
| DE | 102018208935 A1 | 12/2019 |

OTHER PUBLICATIONS

Hong, Jin-Hyuk, Ben Margines, and Anind K. Dey. "A smartphone-based sensing platform to model aggressive driving behaviors." Proceedings of the sigchi conference on human factors in computing systems. 2014. (Year: 2014).*

(Continued)

*Primary Examiner* — Utpal D Shah
(74) *Attorney, Agent, or Firm* — Buchanan Ingersoll & Rooney PC

(57) ABSTRACT

A system for a motor vehicle includes a sensor apparatus having a sensor for determining motor vehicle data and/or driving data of the motor vehicle, and an evaluation unit. The evaluation unit includes an emotion determination unit configured to assess the emotions of the driver of the motor vehicle on the basis of sensor signals transmitted by the sensor.

15 Claims, 2 Drawing Sheets

(56) References Cited

U.S. PATENT DOCUMENTS

| | | | |
|---|---|---|---|
| 2020/0152197 A1* | 5/2020 | Penilla | H04L 67/125 |
| 2020/0210736 A1* | 7/2020 | Matsuo | B60W 50/14 |
| 2022/0036049 A1* | 2/2022 | Lee | G06V 20/56 |
| 2022/0135052 A1* | 5/2022 | Patel | G06V 20/588 |
| | | | 340/439 |

OTHER PUBLICATIONS

Hu, Wenyan, et al. "Mood-fatigue analyzer: towards context-aware mobile sensing applications for safe driving." Proceedings of the 1st ACM Workshop on Middleware for Context-Aware Applications in the IoT. 2014. (Year: 2014).*

Guettas, Amina, Soheyb Ayad, and Okba Kazar. "Driver state monitoring system: A review." Proceedings of the 4th International Conference on Big Data and Internet of Things. 2019. (Year: 2019).*

Chan, Teck Kai, et al. "A comprehensive review of driver behavior analysis utilizing smartphones." IEEE Transactions on Intelligent Transportation Systems 21.10 (2019): 4444-4475. (Year: 2019).*

* cited by examiner

SYSTEM FOR A MOTOR VEHICLE AND METHOD FOR ASSESSING THE EMOTIONS OF A DRIVER OF A MOTOR VEHICLE

CROSS-REFERENCE TO RELATED APPLICATION

This application claims priority to German Patent Application No. 10 2021 118 154.2, filed Jul. 14, 2021, the content of such application being incorporated by reference herein in its entirety.

FIELD OF THE INVENTION

The invention relates to a system for a motor vehicle. The invention also relates to a method for assessing the emotions of a driver of a motor vehicle.

BACKGROUND OF THE INVENTION

Driving a car can produce a variety of different emotional states in the driver. Emotional states while driving vary depending on how the driver feels when he gets into the motor vehicle, the traffic conditions while driving, the behavior of the other road users, the esthetics and the type of the motor vehicle, the driver's own driving style and many other factors. In order to specifically enhance or fundamentally change the emotional state, the environment of the driver or, for example, the control of a drive train of the motor vehicle can be adapted accordingly. For example, appropriate lighting of the interior of the motor vehicle, appropriate music using an audio system or even the driving dynamics of the motor vehicle could be adapted to the emotional situation.

From the prior art it is known that emotions are determined by capturing the driver's face, whereby a camera, in particular an RGB camera, an infrared camera or a thermal imaging camera, is focused on the driver's face and captures the driver's facial expressions. Typical facial expressions that can be captured by the camera include smiling or frowning, as well as head gestures such as nodding and tilting.

The disadvantage of capturing emotions in this way using a camera is that a lot of people have a neutral expression in a wide variety of situations, so that a reliable assessment of the emotional state of the driver is not possible. External factors, such as the illumination of the driver's face, can also adversely affect the quality of the facial expression capture.

Alternatively, it is also possible to measure the heart rate, the electrodermal activity and/or the brain activity in order to determine the emotions of the driver. This requires separate and sometimes complex sensors, which have to be in direct contact with the driver when the motor vehicle is in operation. This can have a negative effect on the driving experience and the user-friendliness of the motor vehicle.

Another alternative is determining the emotions of the driver by evaluating a microphone device disposed in the interior of the vehicle and evaluating how the driver is speaking to a voice assistant or to his or her passenger and then assessing the emotions of the driver from the manner in which the driver is speaking, in particular from the volume, the pitch and the spectral characteristics of the sound. To do so, it is logically absolutely necessary that the driver has to communicate with a third party or with a system while driving to enable a determination of emotions. It is not possible to reliably determine the emotions of the driver while driving by evaluating the signals from the microphone device.

All of the listed options for determining the emotions of the driver while driving are based on directly analyzing the driver himself or the driver's behavior.

SUMMARY OF THE INVENTION

Described herein is a system for a motor vehicle with which the emotions of the driver can be captured easily and reliably.

The system comprises a sensor apparatus having at least one sensor and is used to determine motor vehicle data, such as engine speed, engine torque or other characteristic values of the motor vehicle while driving and/or driving data of the motor vehicle, such as the route, the road conditions or the prevailing weather. The system further includes an evaluation unit, which comprises an emotion determination unit. The emotion determination unit is configured such that the emotions of the driver of the motor vehicle are assessed on the basis of the motor vehicle data and/or driving data of the motor vehicle determined via the sensor signals of the at least one sensor.

The emotions of the driver inevitably affect the way he or she drives. The emotions of the driver are also affected by a variety of environmental factors.

Collecting the motor vehicle data makes it possible to infer the current driving behavior of the driver, and the accompanying emotions can be assessed by means of the emotion assessment unit. A calm manner of driving, which is characterized by minor and few accelerations, for example, indicates a relaxed driver. In contrast, a jerky and very racy manner of driving indicates a currently aggressive driver.

The environmental factors, such as the current weather, the traffic conditions or the surroundings can be determined from the driving data of the motor vehicle, whereby a driver is happy and relaxed when driving along a coastline and in the sunshine, for example, and, in contrast, is in a bad mood and on edge when driving to work in heavy traffic and in a rainstorm.

Since the behavior of the driver, in particular the facial expression, is not captured directly, in particular not by a camera or other means, but rather the emotions of the driver are assessed solely on the basis of easily determinable or readable motor vehicle data and/or driving data of the motor vehicle when the motor vehicle is moving, the emotions of the driver can be determined easily and reliably as the motor vehicle is being driven.

A mobile device is preferably provided, whereby the mobile device comprises the sensor apparatus and the evaluation unit. In a preferred configuration, the mobile device is connected for signal exchange to a readout interface of the motor vehicle, wherein motor vehicle data can be accessed via the readout interface.

Since the sensor apparatus and the evaluation unit are disposed in the mobile device, no additional components, functions or modifications to the motor vehicle are required.

Alternatively, the sensor apparatus and the evaluation unit are disposed in a control unit of the motor vehicle.

In a preferred configuration, the at least one sensor is a GPS sensor, wherein the road conditions, the current weather, the current traffic conditions, the current vehicle speed and/or the current vehicle acceleration can be determined by means of the signals from the GPS sensor and up-to-date accessible map material, wherein the emotions of the driver can be assessed by means of the emotion assessment unit of the evaluation unit on the basis of the road conditions, the current weather, the current traffic conditions, the vehicle speed and/or the current vehicle acceleration. The emotions of the driver can thus be assessed reliably using a single sensor, whereby a wide range of characteristics which are key to the emotions of the driver can be determined from the sensor signals of the GPS sensor in combination with an accessible map.

The sensor apparatus preferably comprises a camera which is focused on the driver for directly capturing the emotions, i.e. the facial expressions, of the driver, wherein the camera is connected for signal exchange to the evaluation unit and wherein the emotions of the driver of the motor vehicle are assessed on the basis of the sensor signals of the at least one sensor and supplementarily by the images from the camera. The supplementary capturing of the facial expressions of the driver allows the emotions of the driver to be assessed even more reliably, whereby capturing the facial expressions of the driver can, for example, be used to confirm emotions assessed from the sensor signals of the at least one sensor. This makes it possible to reliably predict the emotions of the driver.

An input device which is connected for signal exchange to the evaluation unit is preferably provided and is configured such that information about the driver can be added. For example, the age of the driver and the mood, i.e. the emotions, of the driver prior to driving the motor vehicle can be entered via the input device. Such input increases the reliability of the assessment of the emotions of the driver, because driving behavior differs with age, for example, and the driver's mood before starting to drive is a critical factor for the emotions while driving.

The emotions of the driver can preferably be determined using artificial intelligence, i.e. using a model based on machine learning. Such artificial intelligence is described in U.S. Pat. No. 10,074,024, which is incorporated by reference herein in its entirety and for all purposes. The emotion assessment unit comprises an emotion assessment model, which is created in such a way that an algorithm is trained with training data from a wide range of measured sensor signals of the at least one sensor and the resulting motor vehicle data and/or driving data of the motor vehicle as well as different emotion levels, such as joy, frustration, anger. The algorithm determines or recognizes patterns, correlations, dependencies and hidden structures between the sensor signals and related motor vehicle data and/or driving data with the different emotions and independently creates a program code.

When the emotion assessment model is being used, the signals from the at least one sensor, in particular the GPS sensor, are continuously evaluated with respect to the driving data and fed to the emotion assessment model, whereby the emotions of the driver are continuously determined by means of the model.

The data from the input unit can additionally also serve as input variables. This makes it possible to reliably assess the emotions of the driver.

The invention is also achieved by a method for assessing the emotions of a driver of a motor vehicle by means of the above described system. With respect to the advantages, reference is made to the preceding paragraphs.

BRIEF DESCRIPTION OF THE DRAWINGS

A design example of the invention will be explained in more detail with reference to the drawings.

DETAILED DESCRIPTION OF THE INVENTION

Figure 1:
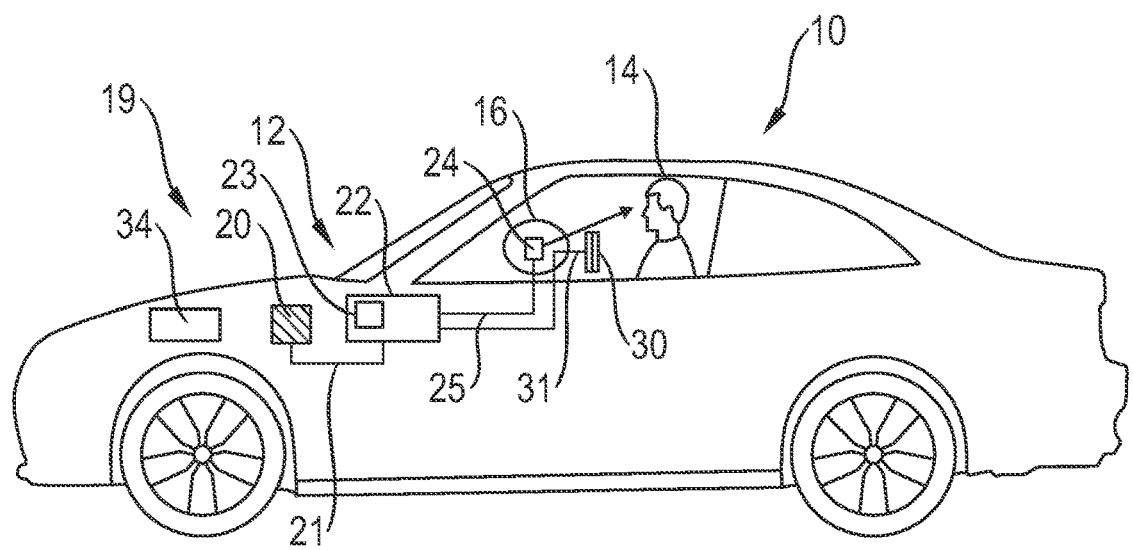
FIG. 1 schematically shows a motor vehicle comprising a system according to aspects of the invention for assessing the emotions of a driver of a motor vehicle.

FIG. 1 schematically shows a motor vehicle 10 comprising a system 12 according to aspects of the invention. FIG. 1 also shows a driver 14, who is sitting in a driver's seat not shown in FIG. 1 and is steering the motor vehicle 10 by means of a steering wheel 16.

The system 12 includes a sensor apparatus 19 comprising a sensor 20, which is configured as a GPS sensor. The system 12 further comprises an evaluation unit 22, which is connected to the sensor 20 via a data line 21 and is used to evaluate the sensor signals of the sensor 20. The system 12 also comprises a camera 24 and an input device 30. The camera 24 is mounted on the steering wheel 16 and is focused on the face of the driver 14 such that the face of the driver 14 is continuously captured by the camera 24. The camera 24 is connected to the evaluation unit 22 via a data line 25, wherein the images from the camera 24 are also evaluated by the evaluation unit 22. The input device 30 is used to input information, which is likewise processed in the evaluation unit 22.

Figure 2:
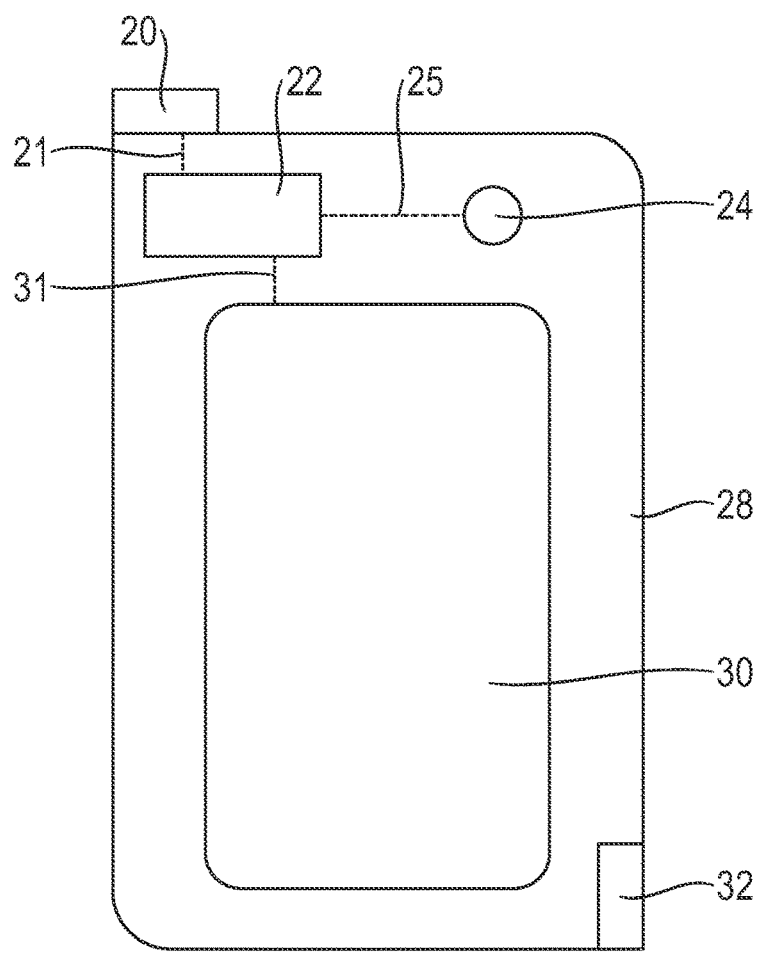
FIG. 2 shows a flow chart of a method for assessing the emotions of a driver of a motor vehicle using the system of FIG. 1.

FIG. 1 shows an example of the system 12 disposed throughout the motor vehicle 10. As shown in FIG. 2, the individual components of the system 12 are preferably all provided in a mobile device 28, in particular a smartphone, wherein the mobile device 28 corresponding to the input device 30 shown in FIG. 1 is disposed in the interior of the motor vehicle 10, so that a front camera 24 of the mobile device 28 is focused on the face of the driver 14. The mobile device 28 also has a Bluetooth interface 32, which communicates with a corresponding readout interface 34 of the motor vehicle 10 and in this way receives motor vehicle data, such as the engine speed, the engine torque, the accelerator pedal position, the steering angle of the steering wheel 16 or other characteristic values of the motor vehicle while driving, from the motor vehicle.

Figure 3:
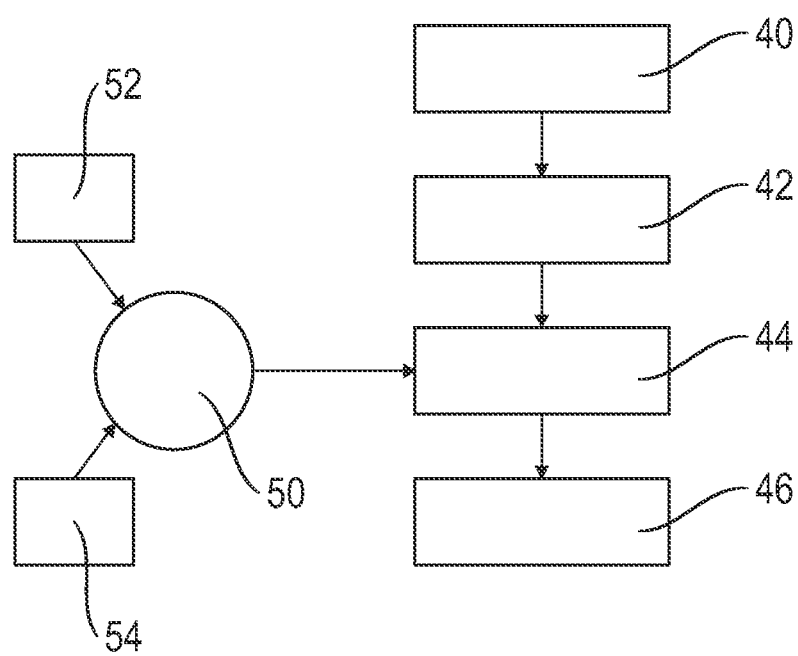
FIG. 3 shows a flow chart of a method for assessing the emotions of a driver of a motor vehicle carried out by an evaluation unit.

FIG. 3 shows a flow chart of a method carried out by the evaluation unit for assessing the emotions of the driver 14 while driving the motor vehicle 10.

In the first step 40, the location of the motor vehicle 10 is continuously ascertained by means of the GPS sensor 20 while driving and this information is used to determine the road conditions, the current weather and the current traffic conditions with the aid of accessible data, whereby, to make such a determination of the road conditions, the weather and the current traffic conditions, the evaluation unit 22 is connected to a corresponding device via a mobile network. The current vehicle speed and the vehicle acceleration are determined on the basis of the sensor signals from GPS sensor 20 as well. The face of the driver 14 is also continuously captured by the camera 24 while the motor vehicle 10 is being driven, and data about the driver 14, for example the mood before driving and the age of the person 14, is retrieved by means of the input device 30.

In a second step 42, the sensor data of the sensor 20 with the associated motor vehicle data and driving data, the images from the camera 24 and the inputs via the input device 30 are processed and the processed data is fed to a determination of the emotions of the driver 14 in the third step 44. The determination or assessment of the emotions of the driver 14 is carried out by an emotion assessment model 50 which is implemented in an emotion determination unit 23 of the evaluation unit 22. The data from the camera 24 is only used to confirm the emotions assessed by the emotion assessment model 50.

The result obtained in the third step 44 is the mood or emotion of the driver 14 at a specific point in time, whereby the result is output in the fourth step 46 and can be used further, in particular for adapting the environment of the driver 14 or adapting the control of a drive train of the motor vehicle 10 to the emotional situation of the driver 14. For example, appropriate lighting of the interior of the motor vehicle, appropriate music using an audio system or even the driving dynamics of the motor vehicle could be adapted to the emotional situation of the driver 14.

The emotion assessment model 50 used to assess the emotions of the driver 14 and implemented in the emotion determination unit 23 is created in such a way that an algorithm 54 is trained using training data 52, wherein the algorithm 54 recognizes patterns, correlations, dependencies and hidden structures in the training data 52 and independently creates a program code. This machine learning produces a statistically optimized emotion assessment model 50. The training data 52 includes a wide range of driving data and motor vehicle data affecting the emotions of the driver 14, such as the weather, the density of traffic, the route, the driving speed, the age of the driver 14, the mood of the driver 14 as a result of driving and different facial expressions of different drivers 14, as well as the different emotions corresponding to the driving data and the motor vehicle data, such as anger or joy, as a target variable.

Structural embodiments other than the described embodiments, which fall within the scope of protection of the claims, are possible as well.

What is claimed is:

1. A system for a motor vehicle, comprising:
   a sensor apparatus comprising a sensor that is configured for (i) determining motor vehicle data and/or driving data of the motor vehicle and (ii) transmitting sensor signals based on the motor vehicle data and/or the driving data of the motor vehicle, wherein the sensor signals are indicative of vehicle speed, vehicle acceleration, current traffic conditions, and current weather conditions,
   an evaluation unit including an emotion determination unit, wherein the emotion determination unit is configured to assess emotions of a driver of the motor vehicle based on the sensor signals transmitted by the sensor, and
   a mobile device, wherein the mobile device comprises the sensor apparatus and the evaluation unit, wherein the mobile device is connected for signal exchange to a readout interface of the motor vehicle, wherein the vehicle data can be accessed via the readout interface,
   wherein, as a function of the emotions of the driver assessed by the evaluation unit, the motor vehicle is configured to adapt either an environment of an interior of the vehicle or control of a drive train of the motor vehicle.

2. The system according to claim 1, wherein a control unit of the motor vehicle comprises the sensor apparatus and the evaluation unit.

3. The system according to claim 1, wherein the sensor apparatus comprises a camera that is configured to be focused on the driver for directly capturing the emotions of the driver, wherein the camera is connected for signal exchange with the evaluation unit and wherein the emotions of the driver of the motor vehicle are assessed on the basis of the sensor signals of the sensor and supplemented by images from the camera.

4. The system according to claim 1, further comprising an input device that is connected for signal exchange with the evaluation unit and is configured such that information about the driver can be added.

5. A method for assessing the emotions of a driver of a motor vehicle using the system according to claim 1.

6. The system according to claim 1, wherein, as a function of the emotions of the driver assessed by the evaluation unit, the motor vehicle is configured to (i) adapt interior lighting of the motor vehicle, (ii) play music in the motor vehicle that is adapted to the assessed emotions of the driver, or (iii) adjust a drive train of the motor vehicle.

7. The system according to claim 1, wherein, as a function of the emotions of the driver assessed by the evaluation unit, the motor vehicle is configured to (i) adapt interior lighting of the motor vehicle, (ii) play music in the motor vehicle that is adapted to the assessed emotions of the driver, and (iii) adjust a drive train of the motor vehicle.

8. A system for a motor vehicle, comprising:
   a sensor apparatus comprising a sensor that is configured for (i) determining motor vehicle data and/or driving data of the motor vehicle and (ii) transmitting sensor signals based on the motor vehicle data and/or the driving data of the motor vehicle, wherein the sensor signals are indicative of vehicle speed, vehicle acceleration, current traffic conditions, and current weather conditions, and
   an evaluation unit including an emotion determination unit, wherein the emotion determination unit is configured to assess emotions of a driver of the motor vehicle based on the sensor signals transmitted by the sensor,
   wherein, as a function of the emotions of the driver assessed by the evaluation unit, the motor vehicle is configured to adapt either an environment of an interior of the vehicle or control of a drive train of the motor vehicle,
   wherein the sensor is a GPS sensor, wherein the driving data of the motor vehicle can be determined by the sensor signals from the GPS sensor and up-to-date map material, wherein the emotions of the driver can be assessed by way of the emotion determination unit of the evaluation unit on the basis of the driving data of the motor vehicle.

9. The system according to claim 8, wherein the sensor apparatus further comprises a camera that is configured to be focused on the driver for directly capturing the emotions of the driver, wherein the camera is connected for signal exchange with the evaluation unit and wherein the emotions of the driver of the motor vehicle are assessed on the basis of the sensor signals of the sensor and supplemented by images from the camera.

10. The system according to claim 8, wherein, as a function of the emotions of the driver assessed by the evaluation unit, the motor vehicle is configured to (i) adapt interior lighting of the motor vehicle, (ii) play music in the motor vehicle that is adapted to the assessed emotions of the driver, or (iii) adjust a drive train of the motor vehicle.

11. The system according to claim 8, wherein, as a function of the emotions of the driver assessed by the evaluation unit, the motor vehicle is configured to (i) adapt interior lighting of the motor vehicle, (ii) play music in the motor vehicle that is adapted to the assessed emotions of the driver, and (iii) adjust a drive train of the motor vehicle.

12. A system for a motor vehicle, comprising:
- a sensor apparatus comprising a sensor that is configured for (i) determining motor vehicle data and/or driving data of the motor vehicle and (ii) transmitting sensor signals based on the motor vehicle data and/or the driving data of the motor vehicle, wherein the sensor signals are indicative of vehicle speed, vehicle acceleration, current traffic conditions, and current weather conditions, and
- an evaluation unit including an emotion determination unit, wherein the emotion determination unit is configured to assess emotions of a driver of the motor vehicle based on the sensor signals transmitted by the sensor,
- wherein, as a function of the emotions of the driver assessed by the evaluation unit, the motor vehicle is configured to adapt either an environment of an interior of the vehicle or control of a drive train of the motor vehicle,
- wherein the emotions of the driver can be determined by means of artificial intelligence, wherein the emotion determination unit comprises an emotion assessment model which is trained with training data that contains a range of sensor signals of the sensor and the resulting motor vehicle data and/or driving data as well as different emotion levels and the emotions of the driver are assessed from sensor signals of the sensor by way of the emotion assessment model.

13. The system according to claim 12, wherein the sensor apparatus further comprises a camera that is configured to be focused on the driver for directly capturing the emotions of the driver, wherein the camera is connected for signal exchange with the evaluation unit and wherein the emotions of the driver of the motor vehicle are assessed on the basis of the sensor signals of the sensor and supplemented by images from the camera.

14. The system according to claim 12, wherein, as a function of the emotions of the driver assessed by the evaluation unit, the motor vehicle is configured to (i) adapt interior lighting of the motor vehicle, (ii) play music in the motor vehicle that is adapted to the assessed emotions of the driver, or (iii) adjust a drive train of the motor vehicle.

15. The system according to claim 12, wherein, as a function of the emotions of the driver assessed by the evaluation unit, the motor vehicle is configured to (i) adapt interior lighting of the motor vehicle, (ii) play music in the motor vehicle that is adapted to the assessed emotions of the driver, and (iii) adjust a drive train of the motor vehicle.

* * * * *